350-376 SR
XR 3,268,879 4029D
SEARCH ROOM
CROSS REFERENCE

INVENTOR
STANLEY J. LINS
BY Thomas J. Nikolai
ATTORNEY

3268879
OR IN 350/114

Aug. 23, 1966 S. J. LINS 3,268,879

MAGNETO-OPTIC READOUT SYSTEM

Filed Nov. 1, 1965 2 Sheets-Sheet 2

United States Patent Office 3,268,879
Patented August 23, 1966

3,268,879
MAGNETO-OPTIC READOUT SYSTEM

Stanley J. Lins, Minneapolis, Minn., assignor to Sperry Rand Corporation, New York, N.Y., a corporation of Delaware Filed Nov. 1, 1965, Ser. No. 505,933
10 Claims. (Cl. 340—174.1)

This invention relates to a magneto-optic detection system for non-destructively detecting the state or sense of magnetization of a thin magnetic film or a signal on a magnetically recorded tape. It also relates to a magneto-optic system for quantitatively determining the magnetic state of a magnetic film which is capable of assuming first and second state magnetic states and which may have intermediate magnetic states in which domains of a first and second magnetic state are present. More specifically, the invention relates to a magneto-optic detection system wherein the light reflected from a magnetic element is split and passed through two light utilization channels one of which analyzes the magnetic domains of the magnetic element which are in one state and the other of which analyzes the domains which are in the other state and including means coupled to said first and second channels to indicate quantitatively the magnetic state of the device.

The invention finds suitable application in both digital and analogue readout of the information stored in the memory portion of a computer such as is used in digital processing equipment and in the study of magnetic domains from a static state film.

Prior art systems have utilized magneto-optic systems to determine the magnetic state of a magnetic element. See United States Patent Number 3,155,944 to Obert et al. In general, this type of magneto-optic readout is defective in that the signal-to-noise ratio is small. This occurs because the signal, which is the change of the D.C. voltage level produced by the photodetector with the change in light intensity as the film changes from one state to another, is so small it is difficult to distinguish this signal from the background noise inherent in photodetection systems. Therefore, any D.C. amplifier used to amplify this small signal must be very stable over long periods of time. Thus, stringent stability requirements are placed on any D.C. amplifier which must be used. In my copending application, Serial Number 505,934, filed Nov. 1, 1965, and assigned to the assignee of the instant application, it was disclosed how A.C. signals could be produced by a magneto-optic detection system thus obviating the necessity of D.C. amplifiers with their stringent stability requirements. However, the single-ended configuration described therein can be improved considerably with the use of the double-ended configuration disclosed in the present application. The single-ended configuration described in my copending application can be used as a digital detector since it distinguishes between the two sense of switch by yielding a second harmonic of the Polarization Azimuth Vibrator (PAV) driving signal when the film is in one state or by yielding a signal with a fundamental component when the film is in the other state. However, this configuration is limited in several respects.

First, it will not reject common mode noise generated by ambient light conditions. Also, stresses and defects in the common optical components cause detrimental ellipticity and depolarization, the perpendicular components of which pass through the analyzer. Transient pulses generated when new storage elements are brought into the field of view, either by scanning of the light beam, or by moving the element before the readout system, as in tape storage, cannot be eliminated. These are defects in practical magneto-optical systems which are frequently overlooked in most laboratory experiments.

In a laboratory test, simple magneto-optical memory detection schemes can yield usable voltage changes when the memory element being observed is switched from one sense to the opposite sense. These detector schemes can be similar to that of Oberg et al., or based on the principle of Hardy as stated in my copending application. In such cases, i.e. under laboratory conditions where a stationary storage element is being observed, all conditions are optimized for that particular memory element. If now a second memory element is substituted, the rudimentary detection schemes may fail to yield distinguishable voltage signals when the film is switched from one sense to the other. In the binary convention, let these senses be arbitrarily called the "0" and "1" sense. In the method of Oberg et al., the binary "0" may be utilized to yield a first D.C. voltage level while the binary "1" may yield a slightly higher D.C. voltage level. As new memory elements are substituted for the original, changes of the optical conditions may, and usually do, yield a second set of D.C. voltage levels for the two binary states. Thus, the "0" reference voltage and the stored information is lost in attempting to substitute a different memory element. In my above noted copending application which describes a PAV assisted Kerr detection system, these problems are greatly alleviated. However, as the device is again considered in practical application, certain more subtle defects appear. In general, thin film storage devices comprising memory planes, memory drums, or tapes, or other practical memory configurations amendable to magneto-optical readout are difficult to observe under conditions wherein each memory element will appear identical to the observing system. For example, if a memory plane comprising an array of permalloy storage elements is scanned with a suitable beam scanning device such as an electro-optical scanner, it is apparent that the angle of incidence will vary over the surface being scanned and that the resulting reflected or transmitted light is of a different nature for each memory element, not considering the Kerr effect or Faraday effect itself. It is well established that polarized light, when reflecting from metallic surfaces, will be converted to elliptically polarized light (see Valasek, Introduction to Theoretical and Exeprimental Optics, John Wiley and Sons, 1949, page 252) depending on the orientation of the plane of polarization to the plane of incidence. This condition varies for each memory element because of the geometry of the scanning system and because of gross irregularities of the surface of the memory plane. These changes of condition, along with variations of reflectivity or transmissivity of the memory elements and changes of light intensity as the beam strikes a memory plane at different angles, are typical of the practical problems not met in apparatus set up for laboratory test operation. In the present system however, it is only necessary to have the polarizer and two analyzers well aligned with respect to each other. These are solidly mounted in any case and, thus, are no problem to maintain. On the other hand, no known scanning system can always insure that the film normal will lie in the plane of incidence and thus the reflected light be constant. In this system it doesn't matter. In previous systems it does.

Another example of a problem not usually considered, or not well treated in any case, is that of preventing the light source from generating pulses of light as the beam moves from one memory element to another, or more generally as a memory element is moved into and out of the field of view. Signals generated under these conditions can have roughly the same time period as the interrogation itself. These spurious signals can thus, in previous schemes, generate erroneous information output signals. This can be somewhat remedied by gating the detectors. However, this is unnecessary in the present invention as will be explained. It is these types of practical problems that my invention remedies and which problems are detrimental to previous schemes.

In addition to solving the above mentioned problems, the present invention has all other advantages inherent in common mode detectors such as the ability to operate under noisy ambient conditions. Furthermore, the electrical signal generated is of a nature directly usable in present electronic schemes unlike those from the single ended configuration described in my copending application. The present invention permits the dynamic detection scheme employing the PAV to operate under optimal conditions, so that the small Kerr or Faraday rotation can be optimally detected.

Thus, the following advantages are obtained with the double-ended configuration. First, the common mode device, in one arrangement, can be used to insure that a "0" signal is always equal to exactly zero volts output with the "1" signal being a high amplitude. The "0" signal is always zero in spite of violent light intensity fluctuations. Second, the common mode configuration cancels perpendicular light components which cannot be cancelled by the single-ended configuration. These components are found in unpolarized and elliptically polarized light and are caused by optical device misalignment, stresses in the optical elements, poor quality polarizers, etc. Third, the common mode configuration can be used either as a binary, ternary, or analogue detector. As a binary detector, it can detect a "0" and a "1" either by amplitude or phase difference. While the single-ended configuration can also detect "0" or a "1" by either amplitude or phase difference, the signals produced by the common mode configuration are far superior. In the amplitude method, the signal amplitude for a "0" is zero compared to a low level second harmonic for the single-ended method. Also, the signal for a "1" is a pure, high level fundamental compared to a combination of the fundamental with a second harmonic component for the single-ended method. As a ternary detector, the common mode configuration will produce a first phase for a "0," a second phase for a "1" and a zero amplitude for a demagnetized film. The common mode configuration can also be used as an analogue detector by yielding a signal whose amplitude is linearly proportional to the area switched of a single element or to the number of films switched. Fourth, the greatest change in signal amplitude as the film changes states can be obtained with the common mode configuration. This can be done by overdriving the PAV by a considerable amount. In the single-ended configuration, this would yield an extremely poor ratio of fundamental to second harmonic in the output signal. The result is that second harmonic rejection becomes poor. In the common mode configuration, the second harmonic is completely eliminated so that any amount of overdriving of the PAV can be utilized.

Figure 1:
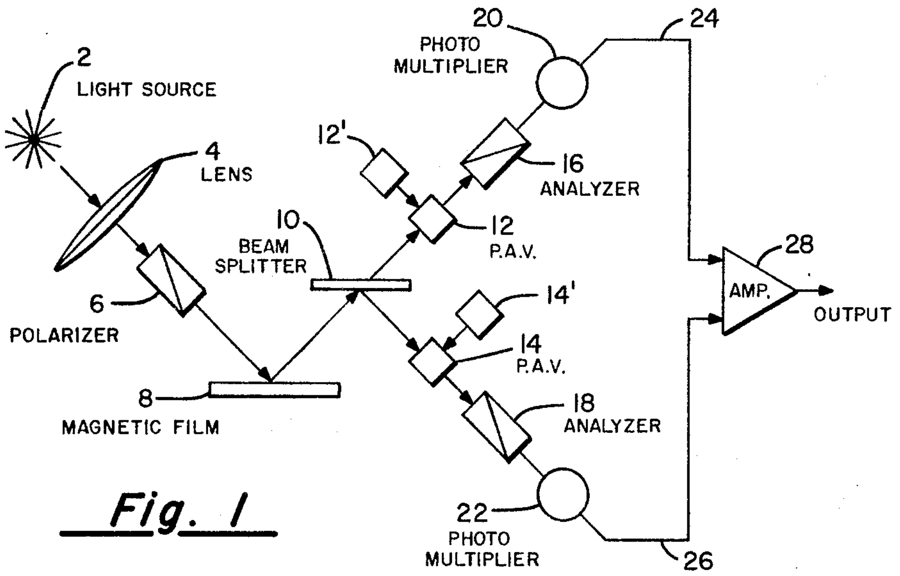
FIGURE 1 is a schematic representation of the common mode magneto-optic system of the present invention.

FIGURE 1 is a schematic representation of the common mode magneto-optic system of the present invention. Light source 2 produces unpolarized light which is collimated by lens 4, polarized by polarizer 6 and focused on a magnetized surface such as thin film 8. The reflected light is rotated by the Kerr effect and passes through beam splitter 10 which divides the light into two identical rays and directs these rays to analyzers 16 and 18 through Polarization Azimuth Vibrators 12 and 14 respectively. The PAV's are driven by sinusoidal drive current sources 12' and 14'. These sources drive the PAV's with an oscillating signal to periodically vary the plane of polarization of the reflected light falling on the analyzers according to a $\cos^2\theta$ function to cause the photomultiplier tubes to produce signals responsive to the periodically varying light. Each analyzer is preferentially orientated to pass light switched in one sense, i.e. analyzer 16 may pass light rotated in a clockwise sense while analyzer 18 may pass the counter-clockwise rotated light. The PAV in each channel causes the rotated light to oscillate about its point of initial rotation. The varying light patterns produced are detected by photomultipliers 20 and 22 and appear as two A.C. outputs. Any ambient light change could now be nulled out by feeding these outputs via lines 24 and 16 to differential amplifier 28.

In order to utilize the system of FIGURE 1 as a device for detecting the magnetic state of a magnetic device such as a thin film, for example, the analyzer in each leg of the common mode system must be adjusted to view the film in a unique manner. This can be accomplished in two ways. First, the analyzers can be so positioned as to produce an amplitude difference and second, they can be positioned so that a phase difference is produced.

In order to produce an amplitude difference, the analyzer in each leg must be oriented in such a manner that each is operating at a different point on the $\cos^2\theta$ response curve with the PAV's 180° out of phase with each other. Consider FIGURE 2(A) which is an enlarged portion of the $\cos^2\theta$ curve near cross polarization or $\theta=90°$. Assume that the magnetized surface is a thin magnetic film and that it is arbitrarily in the "0" state. Here, analyzer 16 in FIGURE 1 is operating about $+\theta$ on the response curve as shown by waveform 2 while analyzer 18 is operating about $-\theta$ on the response curve as shown by waveform 1. The PAV's are operating 180° out of phase. Thus, the transmission axis of the analyzers are symmetrically and oppositely displaced from $\theta=90°$. The outputs of photomultiplier tubes 20 and 22, therefore, are in phase as shown by waveforms 1' and 2'. However, when they are passed through differential amplitfier 28 in FIGURE 1, one of the waveforms is inverted. Thus, the two waveforms cancel each other with a resultant difference signal of zero amplitude output as shown by waveforms 1''–2''. The values of $+\theta$ and $-\theta$ are for illustrative purposes only and other values of $\theta$ can be used as long as the analyzers are symmetrically displaced from $\theta=90°$ with the film in the "0" magnetic state.

Figure 2A:
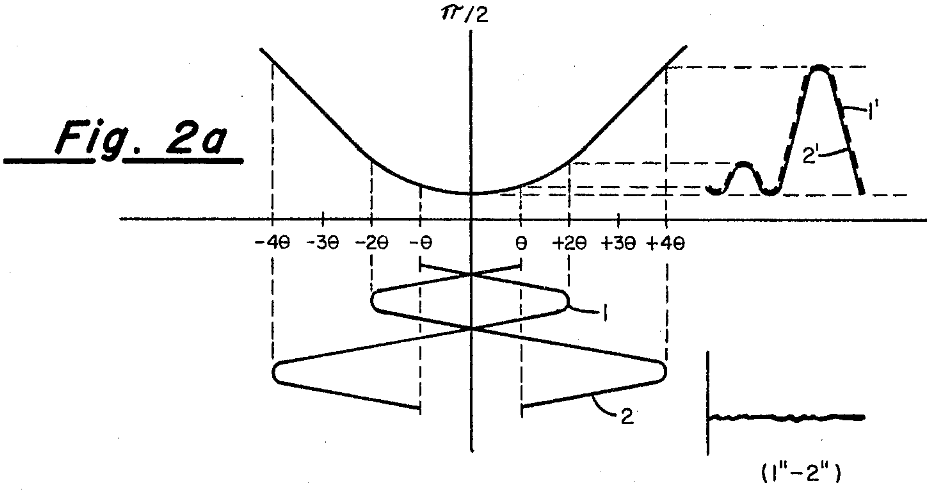
FIGURE 2A is an enlarged portion of the $\cos^2\theta$ response curve near cross polarization with the magnetic element in a first state, the polarization azimuth vibrators out of phase and the analyzers operating at two different points on the response curve to produce a zero amplitude signal output.
Figure 4:
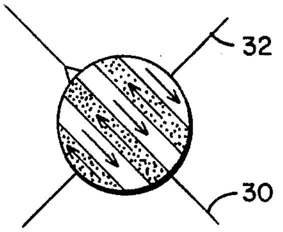
FIGURE 4 shows a thin film in a partial state of switch with some domains appearing dark and the remainder appearing light.
Figures 2B, 3A:
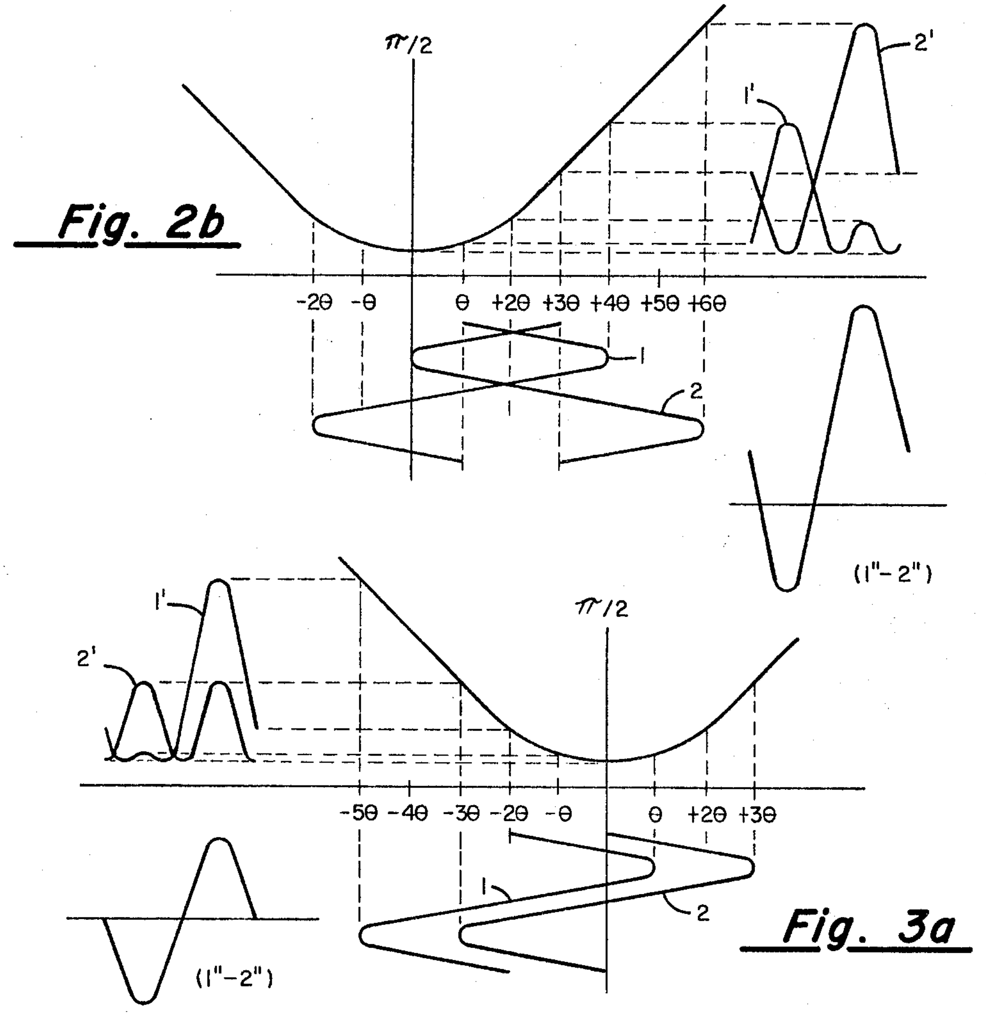
FIGURE 2B is an enlarged portion of the response curve near cross polarization with the magnetic element in a second state to produce a high amplitude signal output.
FIGURE 3A is an enlarged portion of the response curve near cross polarization with the magnetic element in a first state, the polarization on azimuth vibrators in phase and the analyzers operating at two different points on the response curve to produce an output signal of a first phase.

Assume now that the state of the film changes from a "0" to a "1" when, for instance, appropriate signals are applied to lines 30 and 32 in FIGURE 4. As can be seen from FIGURE 2(B), the operating points of the analyzers have shifted by $+2\theta$. It is to be understood that if the original state of the film had been designated as the "1" state, the operating points of the analyzers would have shifted by $-2\theta$ when the film changed states. Analyzer 16 has now moved its operating point from $+\theta$ to $+3\theta$ as shown by waveform 2 while analyzer 18 has moved its operating point from $-\theta$ to $+\theta$ as shown by waveform 1. The output signal now caused by analyzer 16 is shown by waveform 2′ while the output now caused by analyzer 18 is shown by waveform 1′. These two signals are produced by photomultipliers 20 and 22 on lines 24 and 26 respectively in FIGURE 1. Difference amplifier 28 inverts one of the signals to produce the resultant signal shown in FIGURE 2(B) as 1″–2″. Thus, as can be seen in FIGURES 2(A) and 2(B), the output signal is either a zero or a large amplitude depending on the magnetic state of the film. The second harmonic components are cancelled by the difference amplifier and a maximum difference signal is produced as the film changes from one state to the other. It can be seen that overdriving the PAV's has no deleterious effects and, in fact, enhances signal amplitude.

In order to produce a phase difference, analyzer 18 is positioned to operate about $\theta=90°$ while analyzer 16 is caused to operate about $-2\theta$. The PAVs are operating in phase with each other. Consider FIGURE 3(A) which is an enlarged portion of $\cos^2\theta$ curve near cross polarization or 90°. Again, assume that the magnetized surface is a thin magnetic film and that it is arbitrarily in the "0" state. PAV14 oscillates the rotated reflected light about $\theta=90°$ on the response curve to produce a small output signal from photomultiplier 22 of twice the frequency of the PAV driver signal. This signal is shown as waveform 2′ in FIGURE 3(A). PAV12 oscillates the rotated reflected light about $-2\theta$ on the response curve to produce an output signal from photomultiplier 20 that has the same frequency of the PAV drive signal and which has a large amplitude. This signal is shown as waveform 1′ in FIGURE 3(A). When these two signals are passed through differential amplifier 28, an output is obtained as shown in FIGURE 3(A) by waveform 1″–2″.

Figure 3B:
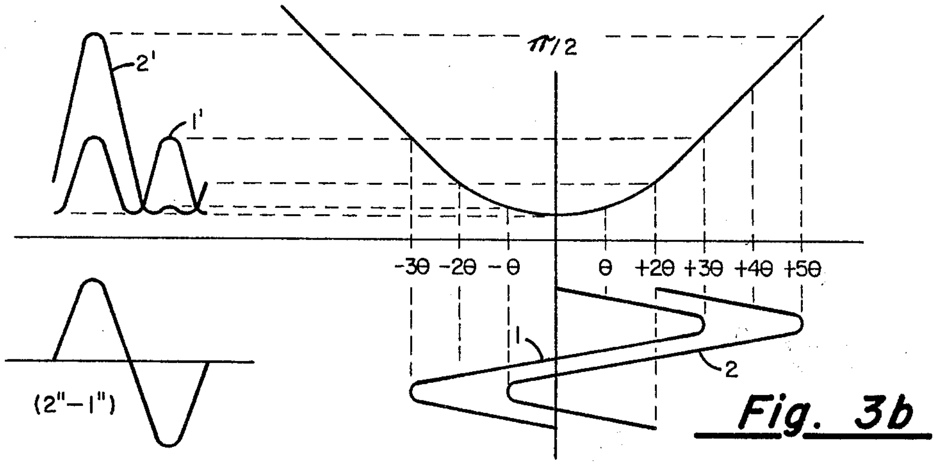
FIGURE 3B is an enlarged portion of the response curve near cross polarization with the magnetic element in a second state to produce an output signal of a second phase.

Assume now that the state of the film changes from a "0" to a "1." As can be seen from FIGURE 3(B), the operating points of the analyzers have shifted by $+2\theta$. Again, it is to be understood that if the original state of the film had been designated as the "1" state, the operating points of the analyzers would have shifted by $-2\theta$ when the film changed states. It can be seen that PAV12 is now oscillating about $\theta=90°$ and PAV14 is oscillating about $+2\theta$. The output signal from photomultiplier 20 is now shown in FIGURE 3(B) as 1′ and is a small signal of twice the frequency of the PAV driver signal. The output signal from photomultiplier 22 is now shown in FIGURE 3(B) and 2′ and is a signal that has the same frequency as the PAV drive signal and which has a large amplitude. When these two signals are passed through differential amplifier 28, an output is obtained as shown in FIGURE 3(B) by waveform 2″–1″. Notice that waveform 1″–2″ in FIGURE 3(A) is 180° out of phase with waveform 2″–1″ in FIGURE 3(B). Thus, when the film switches from one state to another, outputs are developed that are 180° out of phase and which are free of the second harmonic developed in the individual signals before they are passed through the differential amplifier 28. Again, it can be seen that overdriving the PAV's has no deleterious effects since the effect of the second harmonic is cancelled out by the differential amplifier. If the film is demagnetized, no output signal is obtained. Thus, it can be seen that the system serves as a ternary detector with the demagnetized film representing the third state.

If the film is in a partial state of switch such that some domains are switched in one sense and the remainder in the opposite sense, as shown in FIGURE 4, it can be seen that the polarized light reflecting from the film will cause some domains to appear dark and the remainder light for a particular preferential setting of the analyzer azimuth. This azimuth setting in one leg is such that the analyzer transmission axis is responsive to the reflected polarization from the first type of domain in the film while presenting a cross-polarized condition to the reflected light from the type of domains. The second type of domain rotates the polarized light in the opposite sense which is preferentially passed by the second analyzer while presenting a cross-polarized condition to the reflected light from the first type of domains. Thus, the amount of light striking the photomultiplier of a particular channel is a measure of the number or area of magnetic domains of one type seen by that channel. This phenomenon leads to the possibility of an analogue detector since the difference between the two signals present on the two channels is indicative of the amount the film has switched. Thus, if the signals on the two channels are equal, the film is exactly 50% switched. If the film were completely switched in one sense, only one photomultiplier would receive the magneto-optic signals. Film noise would be in phase and would cancel in the differential amplifier. Thus, the voltage inputs to the differential amplifier would produce a maximum change in the output signal level. Using this scheme, any intermediate state would cause a corresponding change of the output signal level including no change in a demagnetized film to a maximum as the film is completely switched in any one sense thereby permitting a quantitative determination of the area switched as well as the direction of switch. This may be shown by considering FIGURE 2(A) and FIGURE 2(B) wherein FIGURE 2(A) shows a "0" output signal which represents no change of magnetic state in the film and FIGURE 2(B) which shows a maximum signal representing a complete switch of the magnetic film from one magnetic state to another. The amplitude of the output signal would rest in between these limits for a partially switched film.

Further, although the system has been described with the use of the Kerr magneto-optic effect, it will function equally well with the use of the Faraday effect.

Thus, applicant has disclosed a novel magneto-optic system for quantitatively determining the magnetic state of a magnetic device and which utilizes the common mode configuration to cancel perpendicular light components caused by optical device misalignment, stresses in the optical elements, poor quality polarizers, violent light intensity fluctuations, etc. Therefore, the device can be used either as a binary, ternary, or analogue detector.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. A Kerr magneto-optic system for quantitatively determining the magnetic state of a magnetic device capable of assuming first and second stable magnetic states and which has intermediate magnetic states which have both first and second magnetic domains, said system comprising:

(a) means for reflecting polarized light from a magnetic device, said reflected light being rotated in clockwise and counterclockwise directions because of the Kerr magneto-optic effect of said first and second magnetic domains;

(b) a first light utilization channel for receiving said reflected light from said first magnetic domains and producing a first signal proportional to the area of the first magnetic domains present in said device;

(c) a second light utilization channel for receiving said reflected light from said second magnetic domains and producing a second signal proportional to the area of the second magnetic domains present in said device; and, (d) means coupled to said first and second channels for producing a signal representative of the difference between said first and second signals to indicate quantitatively the magnetic state of said device.

2. A device as in claim 1 wherein said means for reflecting said polarized light from said magnetic device comprises:

(a) a source of light;
(b) a polarizer; and,
(c) a lens interposed between said light source and said polarizer for focusing said light on said magnetic device.

3. A device as in claim 2 wherein each of said first and second light utilization channels comprises:

(a) a polarization azimuth vibrator;
(b) an analyzer;
(c) a photomultiplier tube; and,
(d) means for driving the polarization azimuth vibrator with an oscillating signal to periodically vary the plane of polarization of the reflected light falling on said analyzer according to a $\cos^2\theta$ function to cause said photomultiplier tube to produce signals responsive to said periodically varying light.

4. A device as in claim 3 wherein:

(a) said analyzer in said first channel is preferentially oriented to pass light rotated in a clockwise direction; and,
(b) said analyzer in said second channel is preferentially oriented to pass light rotated in a counter-clockwise direction.

5. A device as in claim 4 wherein:

said first and second oscillating signals produced by said first and second driving means are 180° out of phase with each other.

6. A device as in claim 4 wherein:

said first and second oscillating signals produced by said first and second driving means are in phase with each other.

7. A device as in claim 5 including:

means for switching said magnetic device from a first to a second stable state.

8. A device as in claim 6 including:

means for switching said magnetic device from a first to a second stable state.

9. A device as in claim 8 wherein said means for producing said difference signal includes a differential amplifier.

10. A Faraday magneto-optic system for quantitatively determining the magnetic state of a magnetic device capable of assuming first and second stable magnetic states and which has intermediate magnetic states which have both first and second magnetic domains, said system comprising:

(a) means for passing polarized light through a magnetic device, said light being rotated in clockwise and counter-clockwise directions because of the Faraday magneto-optic effect of said first and second magnetic domains,
(b) a first light utilization channel for receiving said light rotated by said first magnetic domains and producing a first signal proportional to the area of the first magnetic domains present in said device,
(c) a second light utilization channel for receiving said light rotated by said second magnetic domains and producing a second signal proportional to the area of the second magnetic domains present in said device; and,
(d) means coupled to said first and second channels for producing a signal representative of the difference between said first and second signals to indicate quantitatively the magnetic state of said device.

No references cited.

BERNARD KONICK, *Primary Examiner.*

T. W. FEARS, *Assistant Examiner.*